(12) United States Patent
Haffenden

(10) Patent No.: US 11,604,003 B2
(45) Date of Patent: Mar. 14, 2023

(54) LIQUID LEVEL SENSOR

(71) Applicant: Aspen Pumps Limited, Hailsham (GB)

(72) Inventor: Gary Haffenden, Hailsham (GB)

(73) Assignee: Aspen Pumps Limited, Hailsham (GB)

( * ) Notice: Subject to any disclaimer, the term of this patent is extended or adjusted under 35 U.S.C. 154(b) by 297 days.

(21) Appl. No.: 16/762,351

(22) PCT Filed: Oct. 25, 2018

(86) PCT No.: PCT/GB2018/053094
§ 371 (c)(1),
(2) Date: May 7, 2020

(87) PCT Pub. No.: WO2019/092395
PCT Pub. Date: May 16, 2019

(65) Prior Publication Data
US 2020/0271116 A1    Aug. 27, 2020

(30) Foreign Application Priority Data

Nov. 10, 2017 (GB) .................................... 1718625

(51) Int. Cl.
*F24F 11/32* (2018.01)
*F04D 15/02* (2006.01)
(Continued)

(52) U.S. Cl.
CPC .......... *F24F 11/32* (2018.01); *F04D 15/0218* (2013.01); *F24F 13/222* (2013.01);
(Continued)

(58) Field of Classification Search
CPC ........ G01F 23/24; G01F 23/263; G01F 25/20; F24F 13/222; F24F 2140/30
See application file for complete search history.

(56) References Cited

U.S. PATENT DOCUMENTS 6,278,281 B1    8/2001   Bauer et al.
6,433,560 B1    8/2002   Hansen et al.
(Continued)

FOREIGN PATENT DOCUMENTS

CN    1258002 A    6/2000
CN    1547660 A    11/2004
(Continued)

OTHER PUBLICATIONS

Combined Search and Examination Report for Application No. GB 1718625.5 dated Apr. 17, 2018, 8 pages.
(Continued)

*Primary Examiner* — Henry T Crenshaw
(74) *Attorney, Agent, or Firm* — Seyfarth Shaw LLP

(57) ABSTRACT

The present invention provides a liquid level sensor and an automatic calibration process which removes the need for prior manual calibration of the liquid level sensor, as this happens dynamically during installation and use of the pump. Further, by frequently monitoring the calibration of the sensor and correcting for long term drift or contamination on the sensing surface, the reliability of the liquid level sensor is considerably better than those of the prior art. By operating a solid state sensor, there are no moving parts in the liquid level sensor described above.

17 Claims, 12 Drawing Sheets

(51) Int. Cl.
*F24F 13/22* (2006.01)
*G01F 23/24* (2006.01)
*G01F 23/263* (2022.01)
*G01F 25/20* (2022.01)
*F24F 140/30* (2018.01)

(52) U.S. Cl.
CPC ............ *G01F 23/24* (2013.01); *G01F 23/263* (2013.01); *G01F 25/20* (2022.01); *F24F 2140/30* (2018.01)

(56) References Cited

U.S. PATENT DOCUMENTS

| | | | | |
|---|---|---|---|---|
| 2003/0000303 | A1* | 1/2003 | Livingston | G01F 23/266 73/304 C |
| 2005/0097952 | A1 | 5/2005 | Steph et al. | |
| 2010/0258257 | A1* | 10/2010 | Leinonen | F04D 15/0218 162/49 |
| 2018/0231412 | A1* | 8/2018 | Newman | F24F 13/222 |

FOREIGN PATENT DOCUMENTS

| | | |
|---|---|---|
| CN | 101014838 A | 8/2007 |
| CN | 101389868 A | 3/2009 |
| CN | 101430218 A | 5/2009 |
| CN | 101652641 A | 2/2010 |
| CN | 101784797 A | 7/2010 |
| CN | 201707102 U | 1/2011 |
| CN | 102645253 A | 8/2012 |
| CN | 103090460 A | 5/2013 |
| CN | 203324841 U | 12/2013 |
| CN | 104481891 A | 4/2015 |
| CN | 104535135 A | 4/2015 |
| CN | 204421311 U | 6/2015 |
| CN | 105371470 A | 3/2016 |
| CN | 105780573 A | 7/2016 |
| CN | 205642550 U | 10/2016 |
| CN | 106918132 A | 7/2017 |
| CN | 206338213 U | 7/2017 |
| CN | 107003170 A | 8/2017 |
| CN | 107061226 A | 8/2017 |
| CN | 107074209 A | 8/2017 |
| EP | 2289729 A1 | 3/2011 |
| EP | 2985543 A2 | 2/2016 |
| EP | 2985544 A2 | 2/2016 |
| WO | 2008062146 A1 | 5/2008 |
| WO | 2009019150 A1 | 2/2009 |

OTHER PUBLICATIONS

International Search Report for Application No. PCT/GB2018/053094 dated Jan. 17, 2019, 6 pages.
Written Opinion for Application No. PCT/GB2018/053094 dated Jan. 17, 2019, 8 pages.
Examination Report for corresponding Application No. GB1718625.5 dated Apr. 28, 2021, 4 pages.
Chinese Office Action for corresponding Application No. 201880079778.2 dated Jul. 29, 2021, 6 pages.
Chinese Office Action for corresponding Application No. 201880079778.2 dated May 7, 2022, 10 pages.

* cited by examiner

LIQUID LEVEL SENSOR

CROSS REFERENCE TO RELATED APPLICATIONS

This is a National Stage application of, and claims priority to, PCT/GB2018/053094, filed Oct. 25, 2018, which further claims priority to GB Patent Application No. 1718625.5, filed Nov. 10, 2017, the disclosures of which are incorporated herein by reference in their entirety.

This invention relates to a liquid level sensor for condensate pumps.

BACKGROUND

Air-conditioning (AC) units are one of the most common methods of maintaining the temperature of a space and often use a refrigeration cycle which requires an evaporator and condenser. This allows warm air from a space to be blown over a refrigerant-cooled pipe and cooled before being returned to the space to be conditioned. However, one of the issues with this approach is that condensation is formed on the pipes, as the warm humid air is cooled. This condensate is often left to drip off the pipes and is collected in a drip tray or reservoir. While a small portable AC unit may have a reservoir that can simply be emptied periodically by removing the condensate reservoir, the majority of AC units will have a reservoir that cannot be removed. In these cases, a pipe may be attached to the drip tray and the force of gravity may draw the condensate into a drain. However, if a pipe cannot be run downwards for the entirety of the path between the drip tray or reservoir and the drain, a pump must be fitted to pump out the condensate within the reservoir.

Using a condensate pump to remove the condensate from the reservoir allows for a smaller reservoir to be used, which makes for a more appealing AC unit. However, in some cases, the condensate pump may not be able to empty the reservoir sufficiently quickly or may be malfunctioning, which can result in an overflowing reservoir, potentially causing water to be introduced to the electronics of the system or any neighbouring systems. Large accumulations of condensate can also result in water damage to floors, walls and ceilings of a building which can render a structure unsafe. Therefore, it is essential that condensate reservoirs are effectively monitored and emptied. In such cases, AC units will come with a high water level alert switch for shutting down the AC unit to prevent this situation. Moreover, if the condensate level drops below a minimum level and the condensate pump continues to operate, air may be entrained into the pump and downstream conduits, which might affect the lifespan of the pump and result in increased noise. Also, the condensate pump may rely on the liquid being pumped as a lubricant for the pump piston.

Existing condensate pumps are often mounted within the housing of the AC unit or adjacent to the AC unit in a separate housing to minimise the travel between the condensate reservoir and the condensate pump. However, as the pump motor operates, it causes the condensate pump to vibrate, which in turn causes the pump to rattle within the housing while the system is in use and generates undesirable noise.

Traditionally these pumps have been controlled by a magnetic float that operates magnetic switches within the pump to operate the pump and high level operations. A float system only provides static level indication (i.e. that the pump needs to be turned on and off) and while this is acceptable for basic control, such a system does not allow for measuring and controlling pumping flow rates through the condensate pump. Additionally, floats are mechanical devices and can be subject to physical damage. It is also possible for the floats to become stuck to the bottom of the condensate reservoir during prolonged periods when the AC unit is shut down, such as in winter.

Aside from magnetic floats, capacitance measurements may be used, but only to provide level information and not flow information. However, due to manufacturing differences, the values obtained for a given liquid level will have a tolerance. If this range is significant, the actual level measurement will be inaccurate and could cause air to be drawn into the pump at the switch-off point, creating noise and accelerating wear of the pump motor, or the air conditioning unit would not be switched off in the event of a fault, for example, when a reservoir is overflowing. To account for these tolerances, capacitance-based liquid level sensors can be calibrated by applying a known level of liquid to the pump and scaling it to give the correct value. Problems associated with having to calibrate each liquid level sensor include: the time-consuming nature of the calibration process, which can add to the cost of operating the system; the need to use a liquid to calibrate the liquid level sensor, which means the liquid level sensor gets wet and therefore requires careful drying to prevent damage to its packaging prior to its intended use; and the risk of human error when performing the calibration process.

BRIEF SUMMARY OF THE DISCLOSURE

Viewed from a first aspect, the present invention provides a liquid level sensor having a sensor module having a first sensing element configured to generate a low liquid level detection signal in response to a liquid reaching the first sensing element, a second sensing element positioned above the first sensing element and configured to generate a top liquid level detection signal in response to a liquid reaching the second sensing element, and a level sensing element positioned between the first and second sensing elements and configured to generate a variable liquid level signal in response to the liquid level rising across the level sensing element. The first sensing element, the second sensing element and the level sensing element are electrically connected to a microprocessor configured to receive the low liquid level detection signal, the top liquid level detection signal and the variable liquid level signal. The microprocessor is configured to store the received variable liquid level signal in a non-volatile memory as a low liquid level reference value upon receipt of the low liquid level detection signal and to control a condensate pump in response to the received variable liquid level signal. The microprocessor is also configured to calculate an error value based on the variable liquid level signal and the reference value, determine the operating speed of the condensate pump speed based the calculated error value, and to generate a control signal to operate the condensate pump at the determined speed.

The present invention may also include a third sensing element positioned above the second sensing element configured to generate a high liquid level detection signal in response to a liquid reaching the third sensing element. The third sensing element is electrically connected to the microprocessor, which would be further configured to receive the high liquid level detection signal.

Any of the first or second sensing elements may be electrically connected to the third sensing element.

Any of the low or top liquid level detection signals may be digital output signals. The high liquid level detection output signal of the third sensing element may be a digital output signal.

Any of the first, second or level sensing elements may have a sensing area made of a conductive material. The third sensing element may have a sensing area made of a conductive material. The conductive material may be copper.

Any of the first, second or level sensing elements may be capacitance-based sensors. Where any of the first, second or level sensing elements are capacitance-based sensors, any of the first, second or level sensing elements may be non-contact sensors. The third sensing element may be a capacitance-based sensor. Where the third sensing element is a capacitance sensor, the third sensing element may be a non-contact sensor.

The sensor module may have a longitudinal axis. Any of the first, second, level or third sensing elements may be aligned with the longitudinal axis.

The first sensing element may be connected to the second sensing element.

Any of the second or level sensing elements may have a profile formed of at least two widths. Where the second or level sensing elements have a profile formed of at least two widths, the profile of the level sensing element may vertically overlap with any of the first or second sensing elements.

The level sensing element may be adjacent to any of the first or second sensing elements.

The microprocessor may be a PIC16F18856 microprocessor chip. Using this microprocessor chip is particularly advantageous as it contains the necessary hardware to interface with one or more touch sensors that may be present on the microprocessor chip, thereby reducing the number of components on the sensor.

The liquid sensor may form part of a condensate pump having a housing, a pump motor, a condensate reservoir and a liquid level sensor mounted within the housing such that the liquid level sensor is located within the condensate reservoir and where the liquid level sensor is configured to control the pump motor.

The method of controlling a condensate pump using the described liquid level sensor is believed to be novel and is thus considered from a second aspect. The present invention provides a method of controlling a condensate pump using a liquid level sensor having the steps of: providing a sensor module having a first sensing element configured to generate a low liquid level detection signal, a second sensing element positioned above the first sensing element and configured to generate a top liquid level detection signal, and a level sensing element positioned between the first and second sensing elements and configured to generate a variable liquid level signal; providing a microprocessor having an electrical connection to each of the first sensing element, the second sensing element and the level sensing element, where the microprocessor is configured to receive the low liquid level detection signal, the top liquid level detection signal and the variable liquid level signal, and where the microprocessor is configured to control a condensate pump in response to the received variable liquid level signal; storing the variable liquid level signal as a low liquid level reference value in a non-volatile memory upon receipt of the low liquid level detection signal; calculating an error value from the variable liquid level signal and the low liquid level reference value stored within the non-volatile memory, wherein the error value is calculated as the difference between the variable liquid level signal and the low liquid level reference value; determining the operating speed of the condensate pump speed based the calculated error value; and generating a control signal to operate the condensate pump at the determined speed.

The method may include the step of generating a control signal to operate the condensate pump at a maximum speed in response to receiving a top liquid level detection signal.

The method may include the step of generating a control signal to shut down the connected air-conditioning unit in response to receiving a high liquid level detection signal.

The method may include the step of storing the value of the liquid level signal as a top liquid level reference value in the non-volatile memory upon receipt of the top liquid level detection signal.

The method may include the step of storing the value of the liquid level signal as a high liquid level reference value in the non-volatile memory in response to receipt of the high liquid level detection signal.

Thus, the present invention provides a liquid level sensor and an automatic calibration process which removes the need for prior manual calibration of the liquid level sensor, as this happens dynamically during installation and use of the pump. Further, by frequently monitoring the calibration of the sensor and correcting for long term drift or contamination on the sensing surface, the reliability of the liquid level sensor is considerably better than those of the prior art. By operating a solid state sensor, there are no moving parts in the liquid level sensor described above.

BRIEF DESCRIPTION OF THE DRAWINGS

Embodiments of the invention are further described hereinafter with reference to the accompanying drawings, in which:

FIG. 6b shows the output of the liquid level sensor shown in FIG. 6a;

FIG. 7b shows the output of the liquid level sensor shown in FIG. 7a;

FIG. 8b shows the output of the liquid level sensor shown in FIG. 8a;

FIG. 9b shows the output of the liquid level sensor shown in FIG. 9a;

FIG. 10b shows the output of the liquid level sensor shown in FIG. 10a;

FIG. 11b shows the output of the liquid level sensor shown in FIG. 11a;

DETAILED DESCRIPTION

Figure 1:
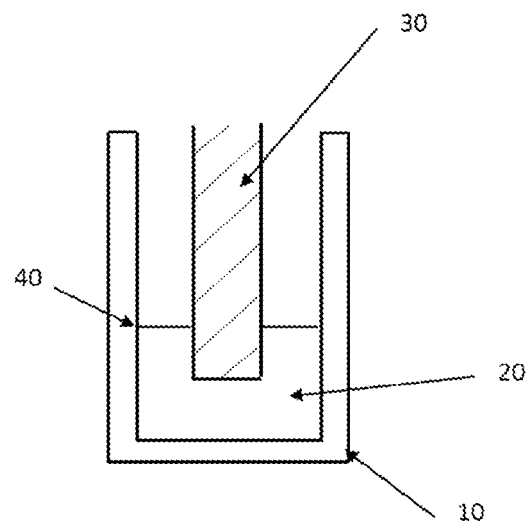
FIG. 1 is an illustration of a prior art liquid level sensor.

FIG. 1 is an illustration of a prior art capacitance-based liquid level sensor 30. The liquid level sensor 30 is arranged within a container 10 which contains a liquid 20 at a liquid level 40. The liquid level sensor 30 is shown as a simple rectangular sensor partially submerged in the liquid 20 within the container 10.

Figure 2:
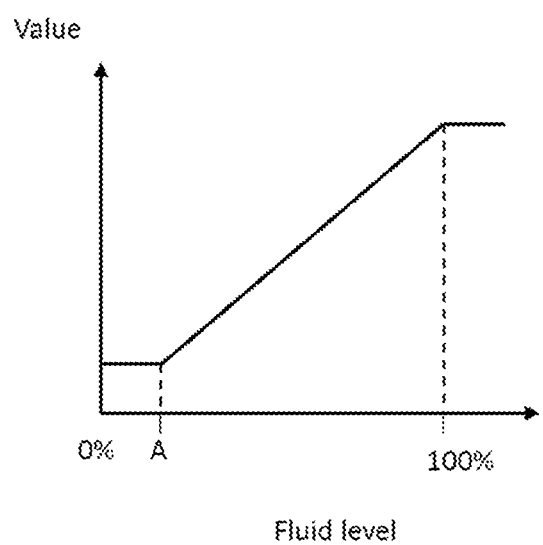
FIG. 2 shows a typical output of such a prior art liquid level sensor.

FIG. 2 shows a typical output of a liquid level sensor 30 such as that shown in FIG. 1. When the container 10 contains liquid 20 at a level 40 below the liquid level sensor 30, there is no change in the output value of the liquid level sensor 30. This is the case until the liquid level 40 rises sufficiently to contact the liquid level sensor 30 ("A"). Beyond liquid level "A", the output value of the liquid level sensor 30 changes with the rising liquid level. As shown, the output value changes linearly with rising liquid level 40; however, other output profiles are conceived by this description. The output value of the sensor will continue to increase until the liquid level 40 rises to the top of the liquid level sensor 30 ("100%") and will stay at this point even if the liquid level 40 increases beyond the top of the liquid level sensor 30.

Figure 3:
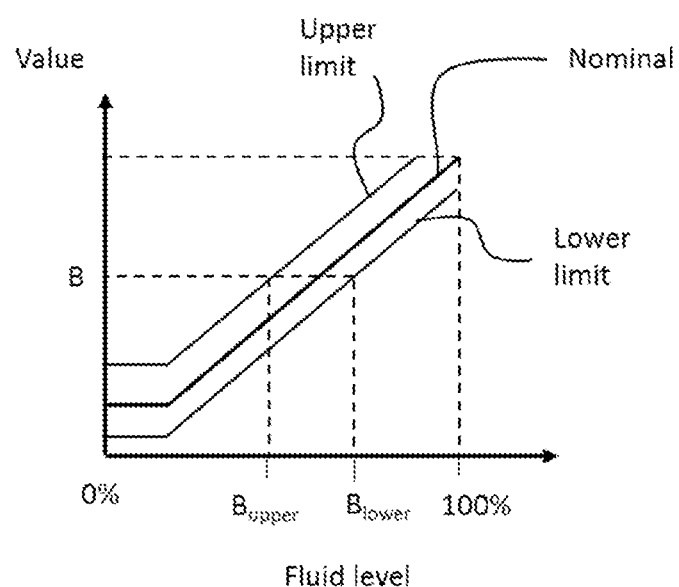
FIG. 3 shows the uncertainty in the output of such a prior art liquid level sensor.

Tolerances arising from differences in the manufacturing process mean that liquid level sensors 30 typically require calibration to function properly in order to return an output value that corresponds to the true liquid level 40. FIG. 3 shows uncertainties in the output of a liquid level sensor 30 due to manufacturing tolerances. The bounds of uncertainty ("Upper limit" and "Lower limit") associated with the output of the liquid level sensor 30 are shown around the "Nominal" response output. At a given liquid level, such as "B" shown in the Figure, a poorly calibrated sensor may return an output value within the range of $B_{upper}$ and $B_{lower}$. While this may be acceptable when the liquid level 40 is not near the maximum level of the container 10, as the liquid level 40 approaches the top of the container 10 or bottom of the sensor 30, it is important to have accurate sensor outputs, as the sensor outputs a specific value when the liquid is at a specific level. If the sensor is poorly calibrated or if the sensor has not been calibrated for a long period of time, an output value which corresponded to a liquid level of 90% capacity at the time of calibration may actually be indicative of an overflowing container 10. Similarly, an output value which corresponded to a liquid level of 10% capacity at the time of calibration, may actually correspond to a liquid level below the sensor. Operating the pump when the liquid level is below the sensor is not desirable, as the liquid 20 being pumped acts as a lubricant for the pump motor. If the liquid level 40 decreases to the extent that there is negligible liquid in the container, the pump will have to restart from a 'dry' state, which is poor from a wear point of view and also increases the likelihood of air being drawn into the pump, both of which might lead to particularly noisy operation and reduced operational lifespan of the pump.

Figure 4:
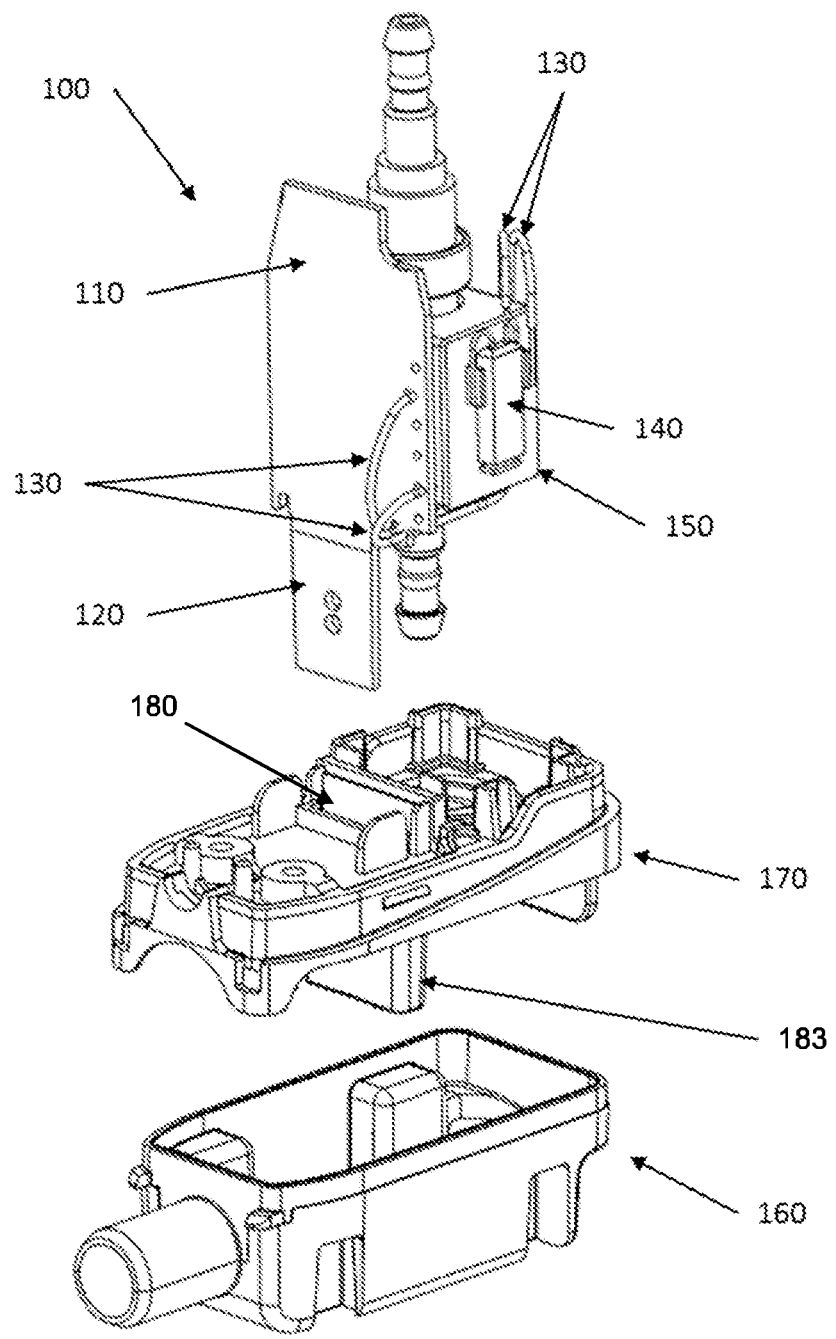
FIG. 4 is a perspective view of an exemplary liquid level sensor and condensate reservoir arrangement.
Figure 13:
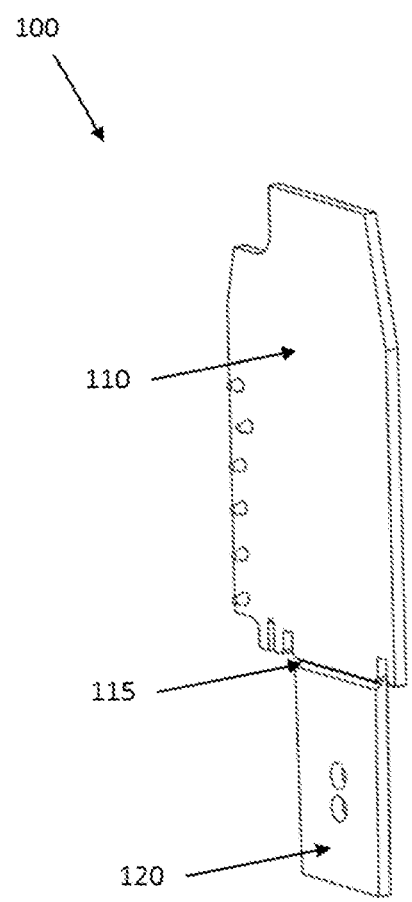
FIG. 13 shows a sensor module including a notch substantially the width of the sensing element.

FIG. 4 is a perspective view of an exemplary liquid level sensor and condensate reservoir arrangement. The arrangement includes a liquid level sensor 100 connected to a pump motor 150 and a microprocessor 140 via electrical connections 130. The microprocessor may be a PIC16F18856 microprocessor chip and may have a non-volatile memory. This microprocessor chip is suited to the present invention as it contains the necessary hardware to interface with one or more touch sensors that may be present on the microprocessor chip, thereby reducing the number of components on the sensor. The touch sensors may be used to manually initiate specific condensate pump operations, such as the calibration process. While a PIC 16F18856 chip is preferable to other microprocessor chips, other chips may be used in combination with other measurement techniques, such as capacitance to frequency conversion. The liquid level sensor 100 has a sensor module 110 and a sensing element 120. Typically, the sensing element 120 is formed of a conductive plate. The conductive material may be copper. Typically, the liquid level sensor 100 is located within a housing (not shown) that is attached to a connecting portion 170 which attaches to a condensate reservoir 160. The connecting portion 170 contains a slot 180 and an associated receptacle 183 which enables the liquid level sensor 100 to be easily positioned within the volume of the condensate reservoir 160. Preferably, the sensor module 110 has a substantially planar elongate form and the sensing element 120 is located on the sensor module 110, as this allows the sensor module to be easily positioned within the volume of the reservoir 160. The sensor module 110 may include a notch 115 across the width of the sensor module 110 (see FIG. 13). The notch 115 may be v-shaped and may also be substantially the width of the sensing element 120. The notch 115 may be run in a substantially horizontal direction. The notch 115 allows the sensor module 110 to flex about an axis during operation. This is desirable, as it allows the sensor 110 to be installed in a configuration where the sensing element 120 is pressed against the inner surface of the receptacle 183. This would ensure the sensing element 120 maintains optimal contact with the internal surface of the receptacle 183 and that the readings provided by the sensor remain accurate during operation of the pump motor 150. This sensor module 110 arrangement occupies a minimal amount of space within the condensate reservoir 160 and results in a connecting portion 170 that is simpler to design and easier to manufacture. However, it is within the scope of the present description to arrange the sensing elements 120 on a sensor module 110 with a non-planar form, such as a cuboid or cylinder, to obtain the benefits of the present invention. Such a sensor module 110 would be equally functional where space was not a concern. Liquid level sensors may rely on physical contact between the liquid 20 and the liquid level sensor 100 to cause a change in output value of the liquid level sensor 30, as the liquid contact causes a change in resistance or capacitance of the sensing element 120 which leads to a corresponding change in output value. In the case of capacitance-based sensors, it is possible to measure the liquid level in a non-invasive manner that does not require the liquid 20 to physically contact the liquid level sensor 100. Such sensing capabilities are achieved by the arrangement shown in FIG. 4, which locates the liquid level sensor 100 within a receptacle 183 which has thin walls to separate the liquid level sensor 100 from the liquid 20, but keeps the liquid level sensor 100 in close proximity to the liquid 20 such that the liquid level 40 is still able to pass across the sensing surface 120 of the liquid level sensor 100. Non-contact or non-invasive liquid level measurement is particularly desirable as it enables the electronics and electrical components of the liquid level sensor 100, such as the microprocessor 140 and electrical connections 130, to be housed separately in a waterproof housing away from the liquid 20 contained within the condensate container 10. The non-contact or non-invasive sensing described may also be considered indirect sensing of the liquid. However, it would be understood that contact sensors arranged in a similar manner to that of the present invention would also benefit from the present invention. Where contact sensors are used, they may be individual sensors arranged around the inner surface of the condensate reservoir 160, or arranged on a similar or non-planar sensor module, where the sensor module is in direct contact with the liquid within the reservoir 160. Where direct contact is made between the liquid and sensor, a thicker sensor cross section may provide a more stable and robust sensor module. The arrangement of FIG. 4 may form part of a condensate pump having a housing to support the liquid level sensor 100, a pump motor 150 and a condensate reservoir 160 attached to the housing. The housing of the condensate pump may also be configured to locate the liquid level sensor 100 within the condensate reservoir 160. The liquid level sensor 100 may be configured to control the pump motor 150.

The liquid level 40 in the condensate reservoir 160 is calculated noninvasively by measuring the capacitance through the walls of the receptacle 183 to the liquid 20. The measurement is completely solid state as the sensor 100 contains no moving parts. The present invention measures the output voltage of a reference capacitor and compares this voltage to the voltage of the liquid level sensor 100. The approach is particularly advantageous, as it uses the internal capacitors of the microprocessor as reference capacitors, negating the need for additional components. The measurement process is in two stages illustrated in FIGS. 5a and 5b. The combined results are used to provide the liquid level value.

Figure 5A:
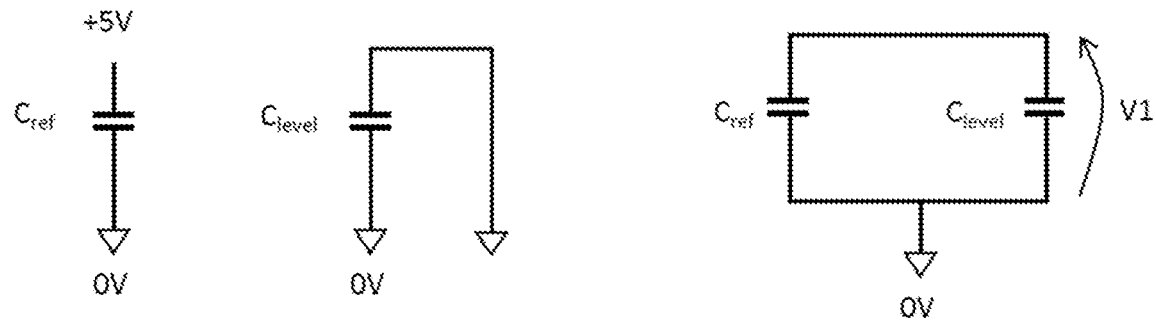
FIGS. 5a and 5b are a schematic layout of the circuits used to calculate the output value of a liquid level sensor.
Figure 5B:
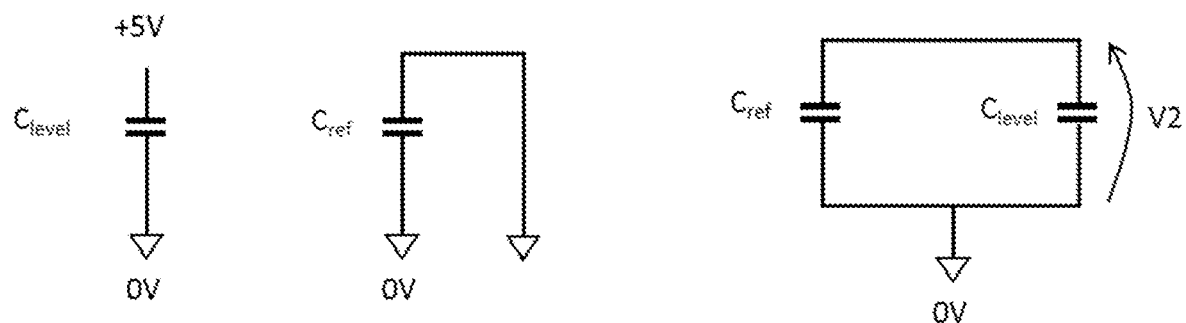

FIGS. 5a and 5b show a schematic layout of the circuits used to calculate the output value of a liquid level sensor of the kind illustrated in FIG. 4. FIG. 5A shows an internal capacitor ("$C_{ref}$") being charged to 5V, and an external capacitor ("$C_{level}$") being discharged to 0 V. The charged internal capacitor is then connected to the external capacitor which results in the external capacitor being charged and a voltage ("V1") being formed across the two capacitors. This voltage is recorded by the microprocessor. FIG. 5b shows the internal capacitor ("$C_{ref}$") being grounded and discharged to 0 V and the external capacitor ("$C_{level}$") being charged to 5 V. The capacitors are then connected together and a voltage ("V2") is developed as the internal capacitor is charged by the external capacitor. This value is also recorded by the microprocessor. The final value used to indicate the liquid level is calculated by subtracting V1 from V2. This way of calculating the liquid level provides an output that is relative to the value to the internal capacitor, which thereby counteracts any changes within the measurement system, such as changes in supply voltage.

Figure 6A:
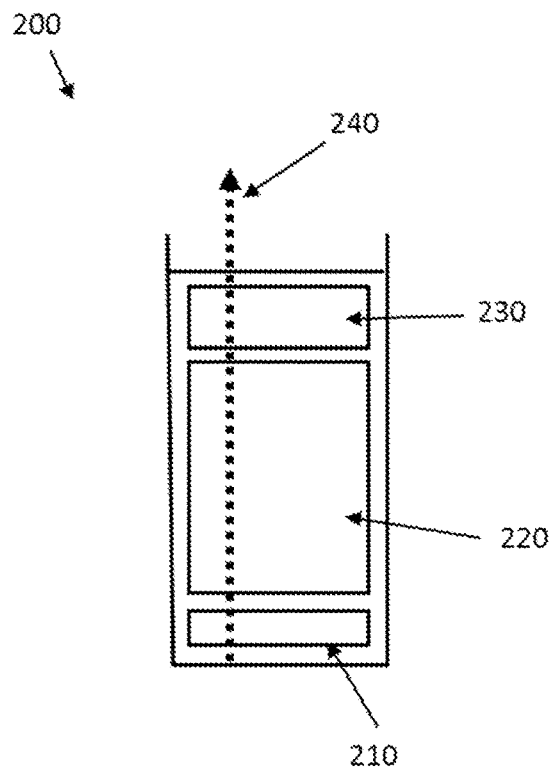
FIG. 6a is an exemplary liquid level sensor having two sensing elements and a level sensing element.

FIG. 6a is an exemplary liquid level sensor having two sensing elements and a level sensing element. A portion of the sensor module of the liquid level sensor 200 is omitted for clarity. The liquid level sensor 200 may be of the kind illustrated in FIG. 4. The first sensing element 210 acts as a bottom switch and is used to indicate the pump off level to prevent the pump running dry when the liquid level is below the pump motor. The second sensing element 230 may be a top switch used to indicate a top liquid level or a high liquid level. The top liquid level may indicate the liquid is at a maximum acceptable level and that the pump may need to be operated in a boost mode to rapidly reduce the liquid level, and the high liquid level may indicate the liquid level is too high and that the AC unit needs to be shut down to prevent further rising of the condensate. The top switch may be used to indicate either or both the top and high liquid levels. The level sensing element 220 is adjacent to both the first sensing element 210 and the second sensing element 230 and is used to calculate the liquid level within the condensate reservoir according to the method described above, using the schematic circuit layouts shown in FIG. 5. As shown in FIG. 6a, the sensing elements 210, 220 and 230 are arranged along a longitudinal axis 240 of the sensor module 200 and the longitudinal axis is substantially vertical. The level sensing element 220 is shown adjacent to the first 210 and second 230 sensing elements. Where the sensing elements are described as being aligned with the longitudinal axis, this also includes the sensing elements being aligned along or arranged with the longitudinal axis. The sensor elements in this case would be arranged in a line. It is possible to have the sensing elements 210, 220, 230 aligned along the longitudinal axis, but spaced from one another. Further, it may be possible to arrange the sensing elements 210, 220, 230 adjacent to one another where the sensing elements are substantially side-by-side to one another with minimal vertical or horizontal offset between the sensing elements 210, 220, 230. However, it is preferable to arrange the sensing elements 210, 220, 230 such that they overlap one another when viewed along the longitudinal axis. This preferred embodiment advantageously allows for a more compact sensor module 200 as the sensing elements are arranged close together. However, it would be apparent that this is not essential to the invention. As part of the setup process during manufacture, the dry values of each of the sensing elements are recorded as reference values.

Figure 6B:
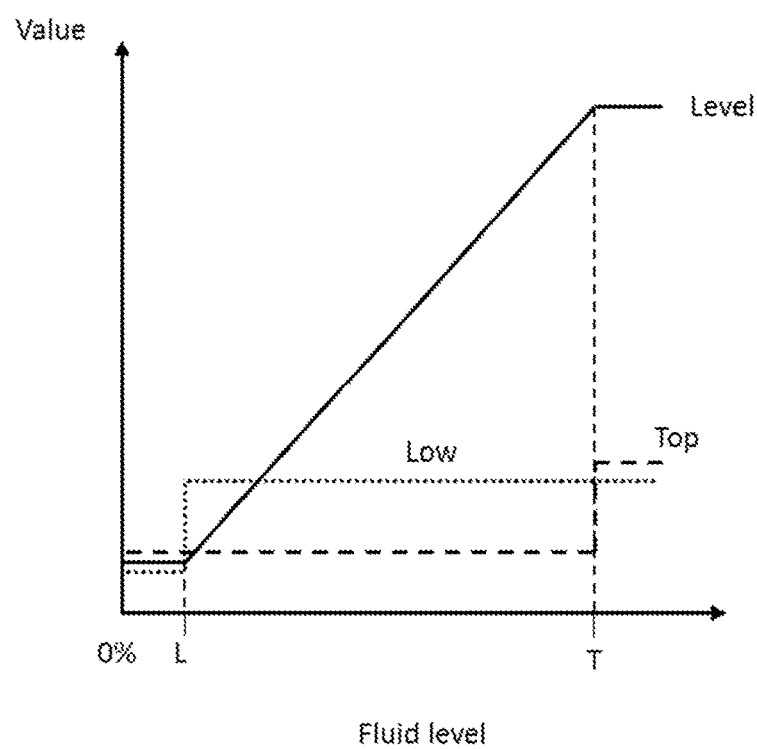

FIG. 6b shows the output of the liquid level sensor shown in FIG. 6a. Each of the sensing elements has an output corresponding to whether or not liquid has reached the level of the given sensor. As the liquid level rises to the first sensing element ("Low"), a low liquid level detection signal is generated indicating the liquid has reached the level ("L") of the first sensing element 210 and that the liquid level is low. Upon reaching liquid level "L", there is a change in the output value of the first sensing element 210 from a first value to a second value which is sent to the microprocessor 140. The first sensing element 210 may indicate the liquid level has reached the bottom switch by outputting a digital output signal. As the liquid level rises further, it contacts the level sensing element 220 and rises across its surface, causing the "Level" signal to increase accordingly. As the liquid level continues to rise, it will eventually pass above the level sensing element 220 and the variable liquid level signal will stop changing. As the liquid level continues to rise it reaches a top liquid level ("T") and contacts the second sensing element 230. At this point there will be a change in the "Top" output value from a first value to a second value which is sent to the microprocessor 140 as a top liquid level detection signal, corresponding to a top liquid level. Having a Top sensor 230 provides a way of independently detecting when the liquid level has reached the maximum or top liquid level and may be used to operate a condensate pump motor 150 at maximum speed to prevent the condensate reservoir 160 from overflowing. The condensate pump 150 may be operated at the maximum speed until the liquid level drops to the 'zero' reference point and the pump is switched off. As described above, instead of being a top liquid level sensor, the second sensing element 230 may be a high liquid level sensor which sends a high liquid level detection signal to the microprocessor 140 and causes the AC unit to shut down and prevent the liquid level from rising any further. Either of the top or high liquid level switches may send a digital output signal to indicate the liquid level has reached the second sensing element.

Figure 7A:
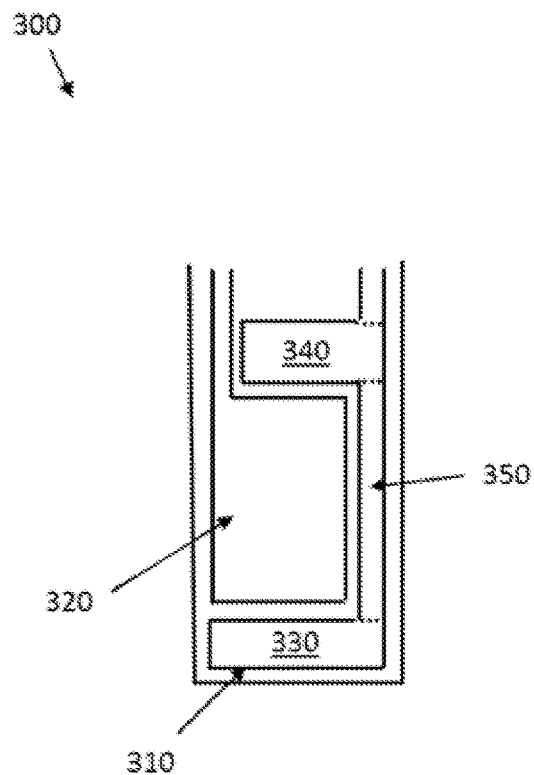
FIG. 7a is an alternative liquid level sensor having a single sensing element formed of two sensing regions connected by a connecting region and a level sensing element.

FIG. 7a is an alternative liquid level sensor 300 having a single sensing element 310 formed of two sensing portions 330, 340 connected by a connecting portion 350, and a separate level sensing element 320. The single sensing element 310 has a profile comprising two horizontal portions 330, 340 and a vertical connecting portion 350. The horizontal portions 330, 340 are interconnected both physically and conductively by the vertical connecting portion 350 and would typically comprise a single unitary member. The level sensing element 320 is disposed in the region between the horizontal portions 330, 340 that is not occupied by the vertical connecting portion 350 and is physically separate therefrom to ensure no electrical conduction between the sensing element 310 and the sensing element 320. A portion of the sensor module of the liquid level sensor 300 is omitted for clarity. The liquid level sensor 300 may be of the kind illustrated in FIG. 4. In this embodiment, the profile of the sensing element 310 is formed of two sensing portions 330, 340. Even though the two sensing portions 330, 340 are electrically connected by a connecting portion 350, the sensing element 310 is able to provide the same functionality to that of the first and second sensing elements 210, 230, as explained below.

Figure 7B:
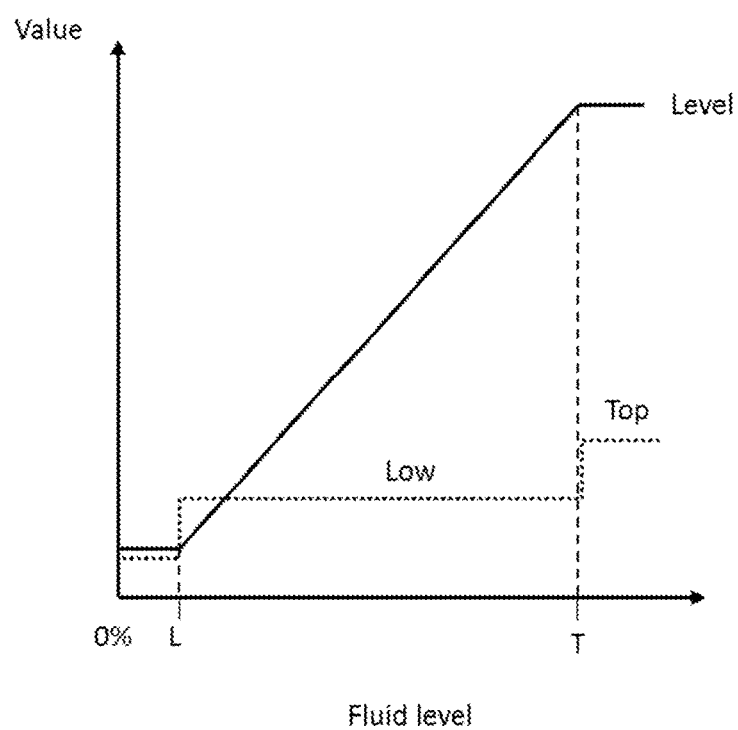

FIG. 7b shows the output of the liquid level sensor shown in FIG. 7a. The first sensing portion 330 provides a "Low" detection signal which corresponds to when the liquid level has reached a low liquid level ("L"). At this point, with a dropping liquid level, the pump motor is switched off to prevent the liquid level from dropping below the level of the pump motor and causing air to be drawn into the pump motor and generating significant noise in operation. Conversely, from a pump off condition and with a rising liquid level, when the liquid level rises to reach the low liquid level ("L"), the low detection signal is used to turn the pump on. The second sensing region 340 may provide a "Top" detection signal which corresponds to when the pump should be run at a maximum speed as the liquid level has reached a top liquid level ("T"). As an alternative, the second sensing region 340 may provide a high liquid level detection signal which corresponds to when the AC unit should be shut down to prevent further condensate being generated and the condensate reservoir from overflowing. In both cases, the same sensing element 310 provides the detection signal for the Low and the Top/High level switches. The two detection signals from the first sensing element 310 indicating either of the bottom or top/high level switches, corresponding to the two respective sensing portions 330, 340, may be in the form of a digital output. The digital output may be of different amplitudes as shown in FIG. 7b. In between the low ("L") and top ("T") liquid levels, the level sensing element 320 operates in substantially the same manner as level sensing element 220 described above and provides a variable liquid level signal corresponding to the liquid level rising across the level sensing element 320. While it is an advantage to use a single sensor to provide multiple detection signals as this reduces the number of sensor circuits on the liquid level sensor, the present invention does not require it.

Figure 8A:
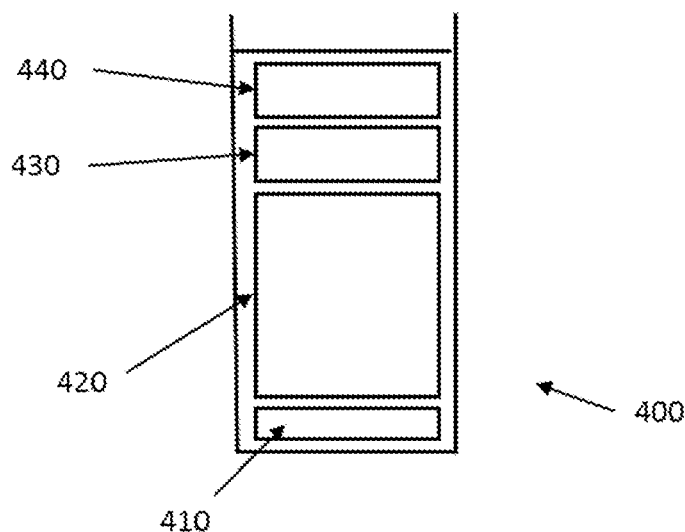
FIG. 8a is an exemplary liquid level sensor having three sensing elements and a level sensing element.

FIG. 8a is an exemplary liquid level sensor having three sensing elements and a level sensing element. The three sensing elements 410, 430 and 440 are arranged substantially along a vertical longitudinal axis of the sensor module (not shown). A portion of the sensor module of the liquid level sensor 400 is omitted for clarity. The liquid level sensor 400 may be of the kind illustrated in FIG. 4. In this embodiment, the first, "Low" sensing element 410 and level sensing element 420 operate in substantially the same manner as the first sensing element 210 and level sensing element 220 of FIG. 6a. Where liquid level sensor 400 differs from other embodiments is in having a separate top sensing element 430 and high level sensing element 440. This allows for the pump motor 150 to operate at a maximum speed while the top liquid level detection signal has been communicated to the microprocessor 140 before a separate high liquid level detection signal is received by the microprocessor 140 indicating the AC unit should be shut down.

Figure 8B:
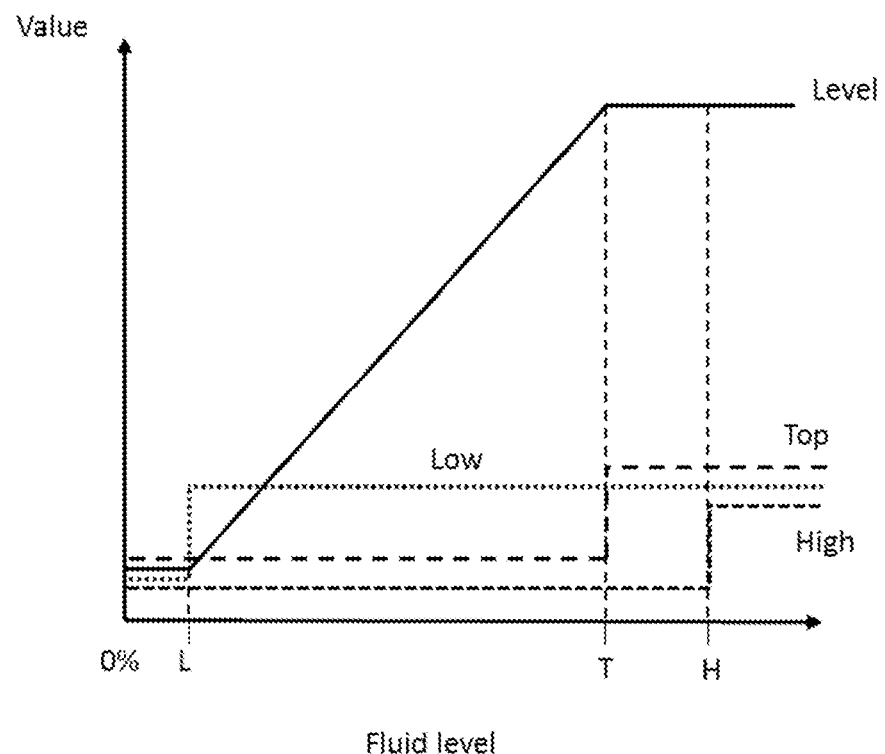

FIG. 8b shows the output of the liquid level sensor shown in FIG. 8a. The sensor operates in substantially the same manner as that shown in FIG. 6b, with the difference being the presence of a separate high liquid level sensing element 440 which provides a further output signal to the liquid level sensor. When the liquid level reaches the high liquid level ("H"), a high liquid level detection signal ("High") is generated and sent to the microprocessor 140. The microprocessor 140 can then send a control signal to shut down the AC unit to prevent further condensate being generated and the liquid level from rising any further. Therefore, the pump motor 150 can operate at a maximum speed when a top liquid level detection signal has been received, but prior to a high liquid level detection signal. It is advantageous to have multiple sensor elements, as failure of one of the sensing elements does not render the liquid level sensor unusable. The remaining sensing elements are able to provide a liquid level sensor with the remaining functionality of those sensing elements, such as high liquid level alerts. While it is advantageous to include multiple sensing elements, it is not essential to the invention.

Figure 9A:
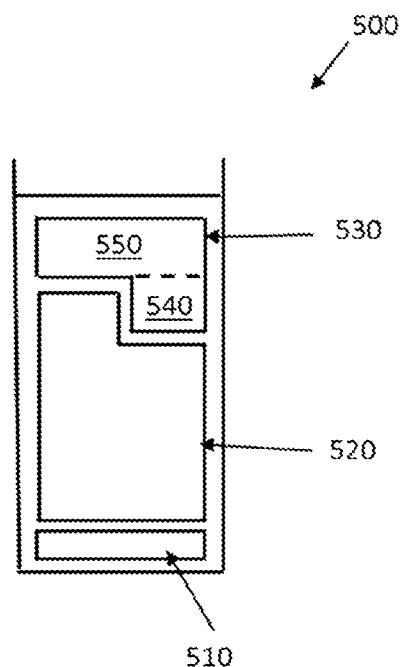
FIG. 9a is an exemplary liquid level sensor having two sensing elements and a level sensing element having a profile formed of two widths.

FIG. 9a is an exemplary liquid level sensor having two sensing elements and a level sensing element having a profile formed of two widths. The first sensing element 510 acts in substantially the same manner as the bottom switches 210, 330 and 410 described in earlier embodiments. Where this embodiment differs from previous embodiments is in the arrangement of the level sensing element 520 and the second sensing element 530. The second sensing element 530 has a substantially L-shaped profile comprising two integral sensing portions 540 and 550 of different widths. The two sensing portions 540 and 550 operate in substantially the same manner as that of the top liquid level sensor 430 and high liquid level sensor 440 of FIG. 8a and provide indications of when a liquid level is at a top liquid level and a high liquid level. As shown in FIG. 9a, the two sensing portions 540 and 550 are electrically connected and have a profile formed predominantly of two widths; the sensing portion 540 having a width approximately half that of the adjacent sensing portion 550 immediately above. The level sensing element 520 has a correspondingly shaped stepped profile at its upper end, immediately below the second sensing element 530. The profiles of the level sensing element 520 and the second sensing element 530 are such that the two sensing elements are able to vertically overlap with one another. As shown, the portion of the level sensing element 520 nearest the high liquid level sensing portion 550 is approximately half that of the width at the end nearest the first sensing element 510. This change in width causes a change in the output value for both the level sensing element 520 and the second sensing element 530, shown in FIG. 9b. In this embodiment, the variable liquid level signal from level sensing element 520 will increase linearly until the liquid level reaches a top ("T") level, at which point the change in width of the level sensing element 520 will result in a different rate of change in value (assuming a constant rate of rising liquid). The output value will change at this different rate until the liquid level reaches a high level ("H"), at which point the output value will stop changing. The second sensing element 530 generates a top liquid level detection signal which corresponds to the liquid level reaching the top sensing region 540 ("Top"). The second sensing element generates a further detection signal corresponding to the liquid level reaching the sensing region 550 ("High"). The detection signals from the second sensing element 530, indicating the top or high level switches, may be in the form of a digital output. The digital output may be of different amplitudes shown in FIG. 9b and should not be treated as being shown to scale.

Figure 9B:
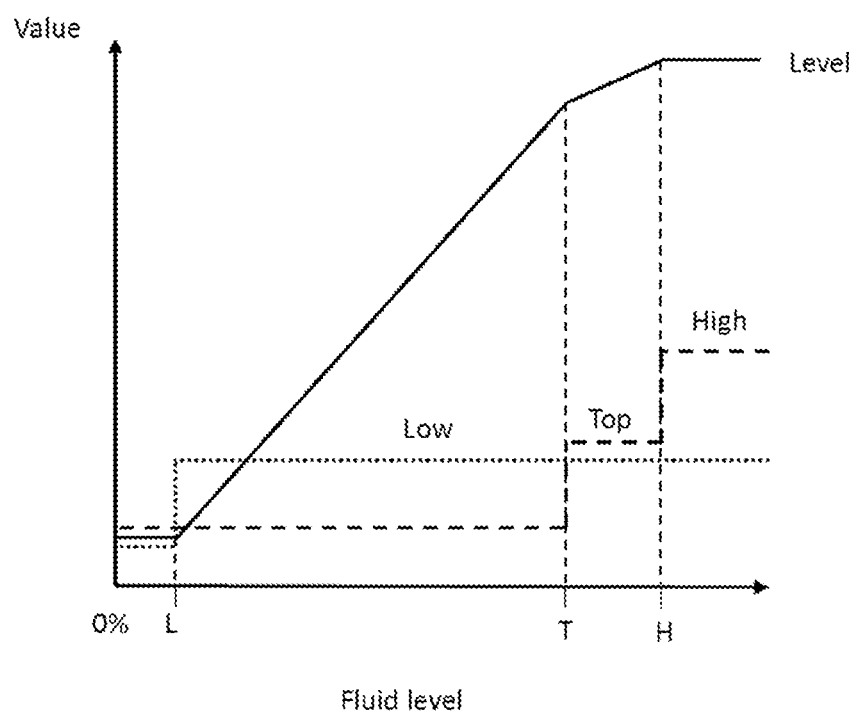

FIG. 9b shows the output of the liquid level sensor shown in FIG. 9a. This embodiment results in a more compact liquid level sensor, as the profiles of the level sensing element 520 and the second sensing element 530 overlap with one another along the longitudinal axis of the sensor module without losing any of the functionality of having a further separated sensing element, such as shown in FIG. 8a.

Figure 10A:
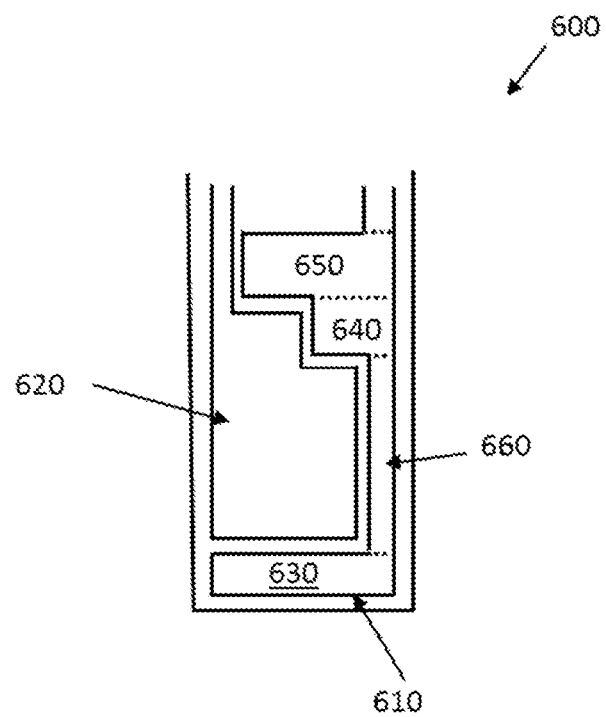
FIG. 10a is an exemplary liquid level sensor having a single sensing element formed of three sensing regions connected by a connecting region and a level sensing element having a profile formed of two widths.

FIG. 10a is an exemplary liquid level sensor having a single sensing element formed of three sensing regions connected by a connecting region and a level sensing element having a profile predominantly formed of two widths. The sensing element 610 has a first sensing portion 630, a second sensing portion 640 and a third sensing portion 650. The first sensing portion 630 is physically and electrically connected to the second sensing portion 640 by the connecting portion 660. This embodiment functions in substantially the same manner as that shown in FIG. 9b, where the first sensing portion 630 acts as a bottom switch sensor, second sensing portion 640 acts as a top switch sensor and the third sensing portion 650 acts as a high level switch sensor. Where this embodiment differs from that of FIG. 9 is the first, second and third sensing portions are electrically connected to one another to have the bottom switch, the top switch and the high level switch all formed on the same integral sensing element 610. In this embodiment, the sensing element 610 has a profile predominantly formed of three distinct widths to provide the different sensing regions 630, 640 and 650. The level sensing element 620 has a correspondingly stepped profile and provides a variable liquid level signal in response to the liquid level crossing the level sensing element 620 and functions in substantially the same manner as the level sensing element 520 of FIG. 9a.

Figure 10B:
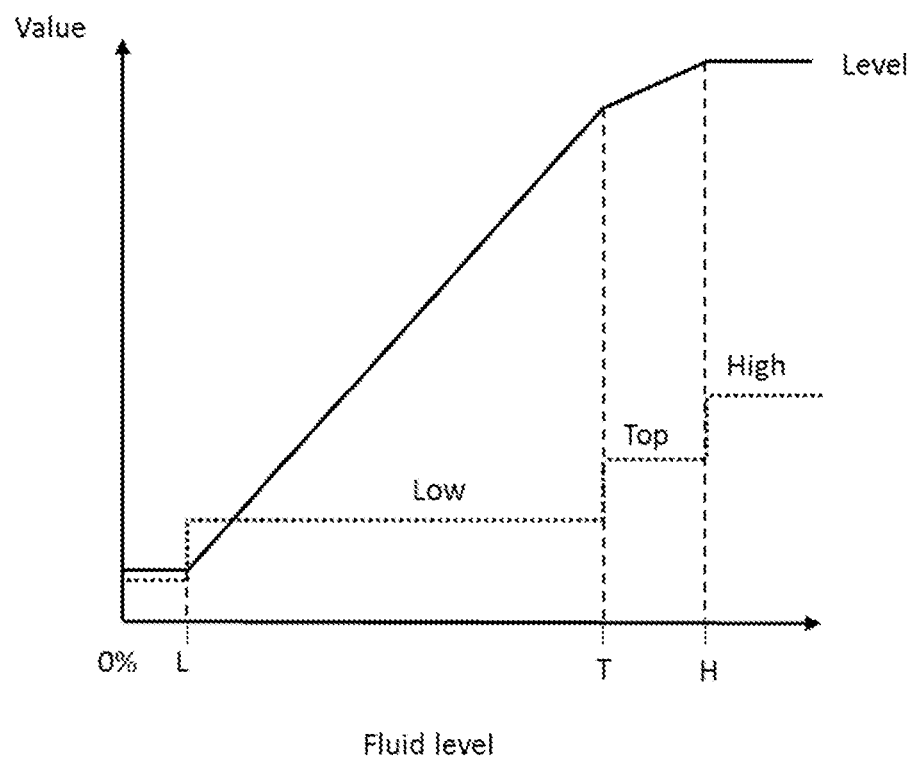

FIG. 10b shows the output of the liquid level sensor 600 shown in FIG. 10a. This embodiment differs from that of FIG. 9b, as the sensing element 610 will provide three detection signals ("Low", "Top" and "High") corresponding to the liquid level reaching the first, second and third sensing portions respectively. This is an alternative to having two separate sensing elements 510 and 530 provide the three detection signals, such as in the embodiment shown in FIG. 9a. The three detection signals from the sensing element 610 indicating the bottom, top and high liquid level switches may be digital outputs. The digital output may be of different amplitudes, such as shown in FIG. 10b.

Figure 11A:
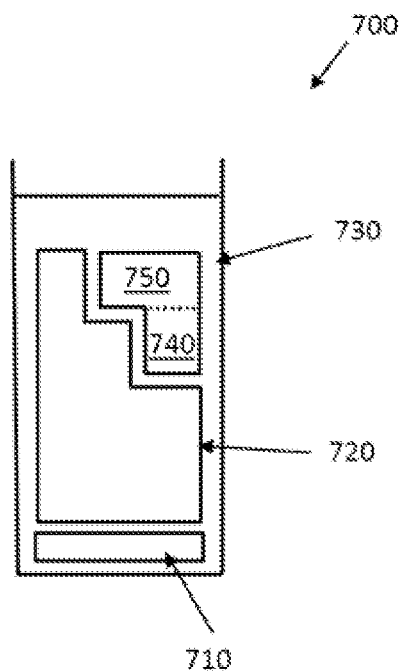
FIG. 11a is an exemplary liquid level sensor having two sensing elements and a level sensing element having a profile formed of three widths.

FIG. 11a is an exemplary liquid level sensor having two sensing elements and a level sensing element having a profile formed of three widths. The first sensing element 510 acts in substantially the same manner as the bottom switches 210, 330, 410 and 510 described in earlier embodiments. Where this embodiment differs from previous embodiments is in the arrangement of the level sensing element 720 and the second sensing element 730. The second sensing element 730 has a profile predominantly formed of two widths which provide the two sensing portions 740, 750. The two sensing portions 740, 750 operate in substantially the same manner as that of the top liquid level sensor 540 and high liquid level sensor 550 of FIG. 9a and provide indications of when a liquid level is at a top liquid level and a high liquid level. The two sensing portions 740, 750 are shown as being electrically connected, but this is not essential. The level sensing element 720 has a profile predominantly formed of three widths, while the second sensing element 730 has a profile predominantly formed of two widths. This allows the second sensing element 730 and level sensing element 720 to vertically overlap with one another and provide a more compact form than that shown in earlier embodiments. The change in width of the level sensing element 720 causes a change in the output value for both the level sensing element 720 and the second sensing element 730, shown in FIG. 11b.

Figure 11B:
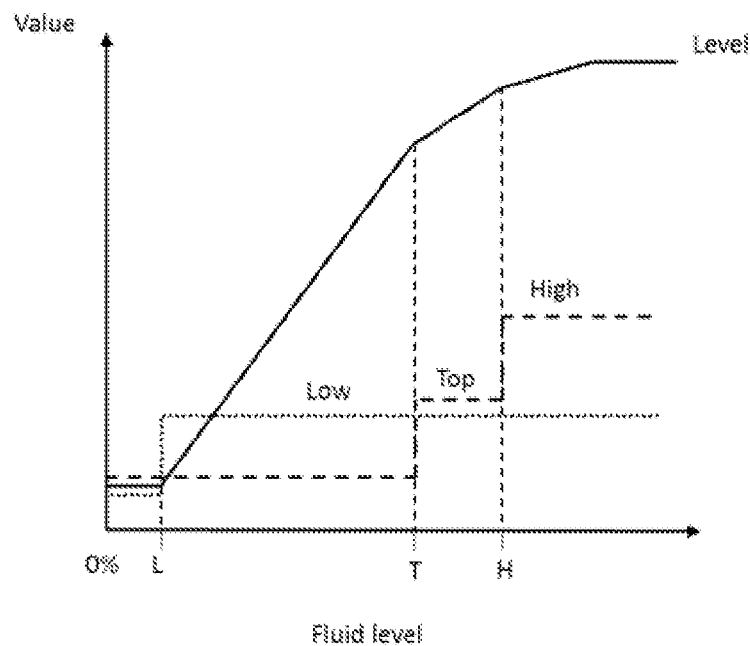

FIG. 11b shows the output of the liquid level sensor shown in FIG. 11a. In this embodiment, the variable liquid level signal outputted by level sensing element 720 will increase until the liquid level is at a top level ("T"), at which point the change in width of the level sensing element 720 will result in a different rate of change in value (assuming a constant rate of rising liquid). The output value will change at this different rate until the liquid level reaches a high level ("H") at which point the output value will change at yet another rate due to the third width of the profile. The output value will continue to rise until the liquid level passes the top of the level sensing element 720, at which point the output value will stop rising. Unlike previously described embodiments, the output value of the level sensing element 720 continues to change even after the high level signal is sent. In this case, the high level signal would not shut down the AC unit and the liquid level would continue to rise. This may be in cases where continued operation of the AC unit and risking an overflowing condensate reservoir is preferable to shutting down the AC unit. Examples of such scenarios may be medicinal products that need to remain chilled or frozen, food storage facilities or computer server rooms. Therefore, the high level detection signal may not shut down an AC unit, but will instead transmit a signal to a building management system indicative of the high liquid level, which may alert a building maintenance worker of a potential fault or problem with the condensate pump and to investigate the issue. While the embodiments shown illustrate the bottom switch being below the level sensor, this is not essential. The bottom calibration sensor may overlap with the level sensor provided the calibration point on the bottom switch is above the lowest permitted water level. In this case triggering the bottom switch will cause the microprocessor to read and store the level sensor value as the reference level used to control the pump motor function.

Figure 12:
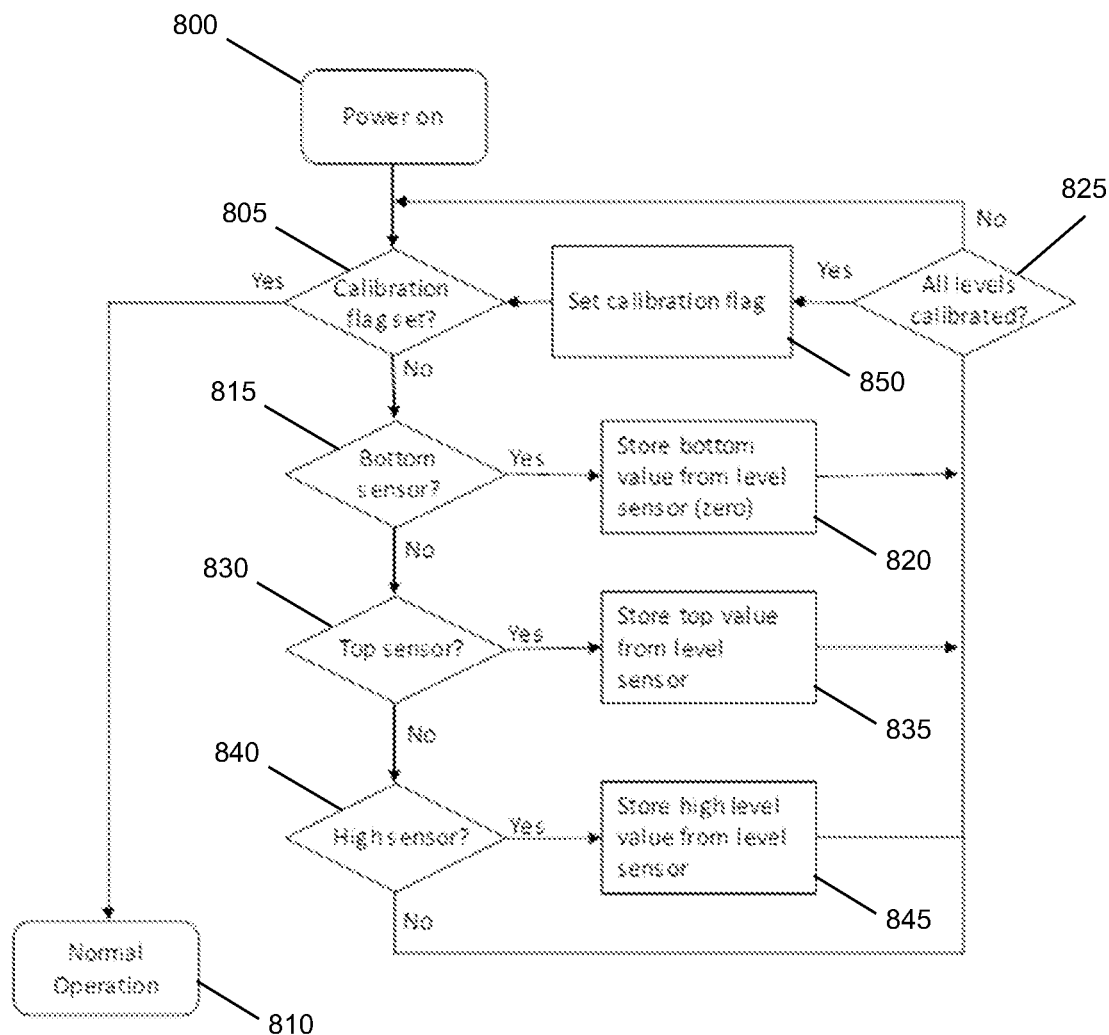
FIG. 12 shows a calibration process for a liquid level sensor.

FIG. 12 shows a calibration process for a liquid level sensor. The present invention also extends to an automatic calibration process such as that shown in FIG. 12 for a liquid level sensor having a first sensing element, a second sensing element, a third sensing element and a level sensing element. FIGS. 8a, 9a, 10a and 11a provide examples of such liquid level sensors. The calibration process is described below. When the pump is started up 800, the microprocessor will determine whether the pump has been calibrated 805 and if not will automatically initiate the calibration process. The calibration process may begin by checking for a calibration flag being set in the microprocessor. If the calibration flag has not been set, this may indicate to the microprocessor that the pump has not been calibrated. The calibration process itself involves allowing the condensate reservoir to fill so that the liquid contained within the condensate reservoir passes each of the sensing elements in turn, before storing the variable level sensor value as a particular reference value for the detected liquid level. As the liquid level rises in the condensate reservoir it will pass the level of the first sensing element 815. This will cause the output value of the first sensing element to change. This may be in a digital manner, where the change is step-like, similar to closing a switch. This change in output value will be received by the microprocessor and will signify to the microprocessor to store the output value of the level sensing element as a 'pump off' or 'zero' reference value in the non-volatile memory of the microprocessor 820. The 'pump off' point is the point at which the pump should be switched off to prevent the reservoir running dry and air to be drawn into the pump motor. This is particularly important, as retaining a volume of water in the reservoir keeps the pump motor lubricated. The 'zero' point of the sensor is used to calibrate the water level sensor, and provide a zero point for the error signal. The pump switches of when the water level reaches the 'zero point'. The way in which the 'pump off' point is used to control the operating speed of the pump motor will be described in greater detail in the subsequent description. The process proceeds to step 825, where the microprocessor determines whether the sensor has been calibrated to all liquid levels. As only the bottom sensor has been calibrated, the calibration process returns to step 805 and the calibration cycle continues. When the process returns to step 815, the microprocessor is determining whether the bottom sensor has changed since the last cycle of the calibration process. As the bottom sensor remains activated, it has not changed its state since the previous cycle and therefore the process continues to step 830.

As the liquid level continues to rise, the liquid level will eventually reach the top switch 830, at which point a change in output value of the second sensing element will be detected by the microprocessor. This change in output value causes the microprocessor to store the output value of the level sensing element as a 'max value' reference point in the non-volatile memory of the microprocessor 835. The 'max value' reference point indicates the maximum allowable value of the level sensing element, as this corresponds to the highest acceptable liquid level. The process continues from step 835 to step 825, and as the sensor has not been calibrated for all levels, the process returns to step 805 and the calibration cycle continues to step 840.

As the liquid level continues to rise, eventually it will reach the high level sensor 840. At this point, the third sensing element will change its output value, which will be detected by the microprocessor. Receiving the detection signal of the high liquid level sensor results in the value of the level sensing element being stored as a 'high level' reference value in the non-volatile memory of the microprocessor 845. This reference value indicates the point at which liquid level is too high and the AC unit should be shut down. The calibration process passes from step 845 to step 825 and as the sensor has been calibrated for all of sensor levels 825 and all of the reference values have been stored, a calibration flag can be set in the microprocessor 850. As the process returns to step 805, because the calibration flag has been set, the sensor exits the calibration process and is controlled in the normal manner 810. It should be noted that while step 805 is included in each cycle of the calibration process, it is equally possible that this step is only performed once after initiation of the pump 800. In this case, a negative outcome from step 825 would cause the microprocessor to proceed to step 815 directly. A positive outcome from step 825 would proceed to step 850 and directly to step 810. Such an approach would require fewer processes to be performed in each cycle of the calibration process. While a cycle-based calibration process has been described, the microprocessor may simultaneously monitor the inputs from all switch sensors, and as each switch sensor is activated, by the liquid level passing each sensor in turn, the microprocess may read the variable output from the liquid level sensor and store the variable output value corresponding to each switch sensor as a reference value for each liquid level. It should be noted that the three references values stored at steps 820, 835 and 845 are not used to control the operation of the pump. The reference values are indicators for the calibration process. The pump can periodically use the three reference values to check the validity of the calibration, as over time it is possible that contaminants can build up on the sensor face and reduce its sensitivity. However, by periodically recalibrating the liquid level sensor in the manner described, it is possible to ensure the pump operates properly.

A method of controlling the pump motor will now be described. Unlike prior art systems, the pump motor is not switched on and off at discrete points. The 'pump off' or 'zero' reference value determined by the calibration process described above is used as a reference value to control the pump motor speed. As the liquid level rises, the level sensing element will output a variable liquid level signal. This liquid level signal is compared to the reference value and forms an error value. The error value is taken to be the 'pump off' reference value stored in the non-volatile memory of the microprocessor subtracted from the current output value of the variable liquid level signal. This error value determines the operating speed of the condensate pump. As the error value increases, the pump motor operating speed increases. The pump will continue to operate until the liquid level equals the reference level, at which point the pump will be switched off. Additional factors, such as how quickly the reservoir is filling/emptying may be factored into the pumping rate calculation to apply an optimal outflow rate and minimise the noise generated by the pump. This is especially important, as only increasing the outflow rate when necessary results in a noise-efficient pump, because noise associated with the pump motor operating is only generated when necessary, such as when the liquid level is at the top liquid level. While it is preferable to control the condensate pump motor using only the level sensor in the manner described above, the bottom, top and high level sensors may be used to provide an alternative control method to ensure the pump operates correctly, for example when the liquid level sensor becomes contaminated or fails.

The sensing elements described may be conductive traces or areas of a conductive material on a printed circuit board (PCB). The conductive material may be copper.

The figures show the sensing elements are arranged substantially above one another, with the first sensing element positioned at the bottom of the sensor module, the level sensing element positioned above the first sensing element and the second sensing element positioned above the level sensing element. Where present, the third sensing element is positioned above the second sensing element. However, while preferable to have the sensing elements arranged vertically above one another on the sensor module, it is not essential. The present invention would apply equally well to a series of sensors located separately within the interior volume of a fluid reservoir provided that the bottom sensing element was located below the level sensor and the top sensing element was located above the level sensing element.

While the shape of the sensing elements have been shown as being substantially rectangular, or having a profile with two or three widths, sensing elements of other shapes are encompassed by this description, such as shapes with tapered or rounded ends or edges. More complex shapes may result in non-linear output values from the liquid level sensor. However, the combination of a level sensing element that produces a variable liquid level signal coupled with at least one sensing element to produce a detection signal enables the method of calibration and control of the liquid level sensor described above to be applied equally well to sensing elements formed of such complex shapes.

The present invention provides a liquid level sensor and an automatic calibration process which removes the need for prior manual calibration of the liquid level sensor, as this happens dynamically during installation and use of the pump. Further, by frequently monitoring the calibration of the sensor and correcting for long term drift or contamination on the sensing surface, the reliability of the liquid level sensor is considerably better than those of the prior art. By operating a solid state sensor, there are no moving parts in the liquid level sensor described above.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A liquid level sensor comprising:
a sensor module having a first sensing element configured to generate a low liquid level detection signal in response to a liquid reaching the first sensing element, a second sensing element positioned above the first sensing element and configured to generate a top liquid level detection signal in response to a liquid reaching the second sensing element, and a level sensing element positioned between the first and second sensing elements and configured to generate a variable liquid level signal in response to the liquid level rising across the level sensing element;
wherein the first sensing element, the second sensing element and the level sensing element are electrically connected to a microprocessor configured to receive the low liquid level detection signal, the top liquid level detection signal and the variable liquid level signal,
wherein the microprocessor is configured to store the received variable liquid level signal in a non-volatile memory as a low liquid level reference value upon receipt of the low liquid level detection signal,
wherein the microprocessor is configured to calculate an error value based on the variable liquid level signal and the low liquid level reference value,
wherein the microprocessor is configured to determine the operating speed of a condensate pump speed based the calculated error value, and
wherein the microprocessor is configured to generate a control signal to operate the condensate pump at the determined speed.

2. A liquid level sensor according to claim 1, further comprising a third sensing element positioned above the second sensing element, configured to generate a high liquid level detection signal in response to a liquid reaching the third sensing element, the third sensing element being electrically connected to the microprocessor, which is further configured to receive the high liquid level detection signal.

3. A liquid level sensor according to claim 2, wherein any of the first or second sensing elements are electrically connected to the third sensing element.

4. A liquid level sensor according to claim 2, wherein the high liquid level detection signal is a digital output signal.

5. A liquid level sensor according to claim 1, wherein any of the low or top liquid level detection signals are digital output signals.

6. A liquid level sensor according to claim 2, wherein the third sensing element comprises a sensing area made of a conductive material.

7. A liquid level sensor according to claim 1, wherein any of the first, second or level sensing elements comprise a sensing area made of a conductive material.

8. A liquid level sensor according to claim 6, wherein the conductive material is copper.

9. A liquid level sensor according to claim 2, wherein the third sensing element is a capacitance-based sensor.

10. A liquid level sensor according to claim 1, wherein any of the first, second or level sensing elements are capacitance-based sensors.

11. A liquid level sensor according to claim 9, wherein the capacitance-based sensor is a non-contact sensor.

12. A liquid level sensor according to claim 1, wherein the sensor module comprises a longitudinal axis and any of the first, second and level sensing elements are aligned with the longitudinal axis.

13. A liquid level sensor according to claim 12, wherein the third sensing element is aligned with the longitudinal axis.

14. A liquid level sensor according to claim 1, wherein the first sensing element is electrically connected to the second sensing element.

15. A liquid level sensor according to claim 1, wherein any of the second or level sensing elements has a profile formed of at least two widths.

16. A liquid level sensor according to claim 15, wherein the profile of the level sensing element vertically overlaps with any of the first or second sensing elements.

17. A liquid level sensor according to claim 1, wherein the level sensing element is adjacent to any of the first or second sensing elements.

* * * * *